United States Patent
Blumenau et al.

(10) Patent No.: US 6,438,595 B1
(45) Date of Patent: *Aug. 20, 2002

(54) LOAD BALANCING USING DIRECTORY SERVICES IN A DATA PROCESSING SYSTEM

(75) Inventors: Steven M. Blumenau, Holliston; Yoav Raz, Newton, both of MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/104,597

(22) Filed: Jun. 24, 1998

(51) Int. Cl.[7] .......................... G06F 15/17; G06F 13/38
(52) U.S. Cl. ........................................ 709/226; 709/229
(58) Field of Search ................................ 709/231, 229, 709/226, 219, 205, 104, 238; 714/4, 769, 770; 711/111, 113, 114, 150; 710/73; 370/352

(56) References Cited

U.S. PATENT DOCUMENTS

| | | | |
|---|---|---|---|
| 4,207,609 A | * 6/1980 | Luiz et al. | 364/200 |
| 4,577,272 A | 3/1986 | Ballew et al. | 364/200 |
| 4,961,244 A | * 10/1990 | Yung | 380/25 |
| 5,146,605 A | 9/1992 | Beukema et al. | 395/575 |
| 5,206,939 A | 4/1993 | Yanai et al. | 395/400 |
| 5,321,816 A | 6/1994 | Rogan et al. | 395/200 |
| 5,335,352 A | 8/1994 | Yanai et al. | 395/800 |
| 5,381,539 A | 1/1995 | Yanai et al. | 395/425 |
| 5,434,850 A | 7/1995 | Fielding et al. | 370/50 |
| 5,461,611 A | 10/1995 | Drake, Jr. et al. | 370/54 |

(List continued on next page.)

FOREIGN PATENT DOCUMENTS

WO   WO 97/16023   5/1997   .......... H04N/7/173

OTHER PUBLICATIONS

Fibre Channel—FAQ's Answers, Technology, Mar. 18, 1998, pp. 1–15; http:www.fibrechannel.com/technology/answer.htm.

Fiber Channel Tutorial, Technology, pp 1–8, Mar. 7, 1998, pp. 1–8; http://www.fibrechannel.com/technology/tutorial, htm.

Networking Group, Internet–Draft, Paul J. Leach, Dilip C. Naik, "A Common Internet File System (CIFS/1.0) Protocol", Dec. 19, 1997, pp. 1–121.

(List continued on next page.)

*Primary Examiner*—Robert B. Harrell
*Assistant Examiner*—Bunjob Jaroenchonwanit
(74) *Attorney, Agent, or Firm*—Howrey Simon Arnold & White, LLP

(57) ABSTRACT

A data network links a number of host processors to alternative shared resources. In order to allocate a respective subset of the alternative shared resources to each host, a directory service of the network is programmed to present a respective view of the network to each host. For example, hosts on the same network loop may see a different picture of the network. When a host logs into the network, the directory service reports to the host information about the alternative shared resources that the host should use. The host then commences a sequence of data processing operations during which the host accesses only the shared resources that were reported to it by the directory service. The shared resources, for example, are ports of a storage subsystem, and a respective subset of the ports is assigned to each host to balance loading of the hosts on the ports.

33 Claims, 8 Drawing Sheets

U.S. PATENT DOCUMENTS

| | | | |
|---|---|---|---|
| 5,517,494 A | | 5/1996 | Green .......................... 370/60 |
| 5,526,414 A | | 6/1996 | Bédard et al. ............... 379/221 |
| 5,528,755 A | * | 6/1996 | Breadsley et al. ...... 395/185.01 |
| 5,544,313 A | | 8/1996 | Shachnai et al. ....... 395/200.01 |
| 5,544,327 A | | 8/1996 | Dan et al. ................... 395/250 |
| 5,544,347 A | | 8/1996 | Yanai et al. ................ 395/489 |
| 5,553,160 A | | 9/1996 | Dawson ....................... 382/166 |
| 5,557,611 A | | 9/1996 | Cappellari et al. ......... 370/60.1 |
| 5,579,475 A | * | 11/1996 | Blaum et al. .......... 395/182.05 |
| 5,583,995 A | | 12/1996 | Gardner et al. ......... 395/200.09 |
| 5,619,497 A | * | 4/1997 | Gallagher et al. ............. 370/60 |
| 5,630,067 A | | 5/1997 | Kindell et al. .......... 395/200.09 |
| 5,634,111 A | | 5/1997 | Oeda et al. .................. 395/480 |
| 5,646,676 A | | 7/1997 | Dewkett et al. ............... 348/7 |
| 5,657,468 A | | 8/1997 | Stallmo et al. ............. 395/411 |
| 5,689,678 A | | 11/1997 | Stallmo et al. ............. 395/441 |
| 5,727,151 A | | 3/1998 | Sugahara et al. ...... 395/200.13 |
| 5,734,830 A | | 3/1998 | Balogh et al. .............. 709/208 |
| 5,740,422 A | * | 4/1998 | Foltz et al. .................. 395/609 |
| 5,742,792 A | | 4/1998 | Yanai et al. ................ 395/489 |
| 5,748,905 A | | 5/1998 | Hauser et al. .............. 709/249 |
| 5,774,660 A | * | 6/1998 | Brendel et al. ............. 709/201 |
| 5,778,426 A | | 7/1998 | DeKoning et al. .......... 711/122 |
| 5,787,459 A | | 7/1998 | Stallmo et al. ............. 711/112 |
| 5,793,385 A | | 8/1998 | Nale .......................... 345/515 |
| 5,796,966 A | | 8/1998 | Simcoe et al. .............. 395/311 |
| 5,802,301 A | | 9/1998 | Dan et al. ............... 395/200.53 |
| 5,825,772 A | * | 10/1998 | Dobbins et al. ............ 370/396 |
| 5,835,485 A | * | 11/1998 | Grube et al. ................ 370/312 |
| 5,860,137 A | * | 1/1999 | Raz et al. ................... 711/202 |
| 5,862,403 A | * | 1/1999 | Kanai et al. ................ 395/826 |
| 5,884,103 A | | 3/1999 | Terho et al. ................ 395/892 |
| 5,892,915 A | | 4/1999 | Duso et al. ............ 395/200.49 |
| 5,892,924 A | | 4/1999 | Lyon et al. ................. 709/245 |
| 5,893,116 A | * | 4/1999 | Simmonds et al. ......... 707/201 |
| 5,893,140 A | | 4/1999 | Vahalia et al. .............. 711/118 |
| 5,893,919 A | | 4/1999 | Sarkozy et al. ............. 711/114 |
| 5,901,327 A | * | 5/1999 | Ofek .......................... 395/825 |
| 5,907,837 A | | 5/1999 | Ferrel et al. .................... 707/3 |
| 5,914,939 A | * | 6/1999 | Serkowski et al. .......... 370/254 |
| 5,920,893 A | * | 7/1999 | Nakayama et al. ......... 711/147 |
| 5,930,827 A | | 7/1999 | Struges ....................... 711/170 |
| 5,933,603 A | | 8/1999 | Vahalia et al. ......... 395/200.55 |
| 5,935,205 A | * | 8/1999 | Marayama et al. ......... 709/216 |
| 5,940,612 A | | 8/1999 | Brady et al. ................ 395/673 |
| 5,940,870 A | * | 8/1999 | Chi et al. .................... 711/206 |
| 5,948,062 A | * | 9/1999 | Tzelnic et al. .............. 709/219 |
| 5,951,694 A | * | 9/1999 | Choquier et al. .............. 714/15 |
| 5,959,968 A | * | 9/1999 | Chin et al. .................. 370/216 |
| 5,974,453 A | * | 10/1999 | Andersen et al. ........... 709/220 |
| 5,978,951 A | | 11/1999 | Lawler et al. ............... 714/758 |
| 5,991,793 A | * | 11/1999 | Mukaida et al. ............ 709/104 |
| 6,009,535 A | * | 12/1999 | Halligan et al. ................ 714/5 |
| 6,023,281 A | | 2/2000 | Grigor et al. ............... 345/512 |
| 6,026,441 A | * | 2/2000 | Ronen ........................ 709/227 |
| 6,031,977 A | * | 2/2000 | Pettus ........................ 709/230 |
| 6,044,442 A | | 3/2000 | Jesionowski ................ 711/153 |
| 6,092,096 A | * | 7/2000 | Lewis .......................... 709/200 |
| 6,111,894 A | | 8/2000 | Bender et al. ............... 370/469 |
| 6,119,121 A | | 9/2000 | Zhu ............................ 707/101 |
| 6,160,813 A | | 12/2000 | Banks et al. ................ 370/422 |
| 6,195,703 B1 | | 2/2001 | Blumenau et al. .......... 709/238 |
| 6,209,023 B1 | * | 3/2001 | Dimitroff et al. ........... 709/211 |
| 6,223,205 B1 | * | 4/2001 | Harchol-Balter et al. ... 709/105 |
| 6,260,120 B1 | | 7/2001 | Blumenau et al. .......... 711/152 |
| 6,278,705 B1 | | 8/2001 | Chau et al. .................. 370/352 |
| 6,295,757 B1 | | 9/2001 | Blumenau et al. ............. 711/5 |
| 2001/0046237 A1 | * | 11/2001 | Chan et al. ................. 370/419 |

OTHER PUBLICATIONS

Fibre Channel Overview, Zoltán Meggyesi, KFKI—RMKI, Research Institute for Particle and Nuclear Physics, Dec. 9, 1997; pp 1–10, http://www1.cern.ch/HSI/fcs/spec/overview.htm.

Fibre Channel, TR–20–199x, "Fabric Loop Attachment" (FC–FLA) Rev. 2.7, NCITS Working Draft Proposed Technical Report, Aug. 12, 1997, pp. i–xiv, 1–122.

TINA, "A Common Software Architecture for Multimedia and Information Services" Emmanuel Darmois, Motoo Hoshi, Aug. 9, 1997, pp. 1–6. http://www.tinac.com/about/nutshell.htm.

IEEE/IEEE Electronic Library, "Performance Model of the Argonne Voyager" Dixz, T.; Olson, R; Stevens, R.; Div. of Math & Comput.Sci., Argonne Nat. Lab, IL, USA; Application–SpecificSystems, Architectures and Processors 1997, Conference held: Jul. 14–16, 1997, pp. 316–327.

IEEE/IEE Electronic Library, "Scheduling for Interactive Operations in Parallel Video Servers" Min–You Wu; Wei Shu, Dept. of Comput. Sci., State Univ. of New York, Buffalo, NY; Multimedia Computing and Systems '97 Conference held: Jun. 3–6, 1997, pp. 178–185.

IEEE/IEE Electronic Library, "On The Efficient Retrieval of VBR Video in a Multimedia Server" Sambit Shau; Zhi–Li Zhang; Kurose, J.; Towsley, D. Dept. of Comput. Sci., Massachusetts Univ., MA. Multimedia Computing and Systems '97, Jun. 3–6, 1997, pp. 46–53.

IEEE/IEE Electronic Library, "Scheduling of Storage and Cache Servers For Replicated Multimedia Data" Park Kyeongho; Yanghee Choi; Chong Sang Kim, Dept. of Comput. Eng., Seoul Nat. Univ., South Koria; High Performance Computing on the Information Superhighway, 1997 HPC Asia '97, Apr. 18—May 1, 1997, pp. 484–487.

Fibre Channel. Fabric Generic Requirements (FC–FG) Rev. 3.5; ANSI X3.289–199x; X3T11/Project958–D; Working Draft Proposed American National Standard for Information Systems, Aug. 7, 1996, pp. i–x, 1–23.

IEEE/IEE Electronic Library, "The Design and Implementation of a Multimedia Storage Server to Support Video–On– Demand Applications" Molano, A.; Garcia–Martinez, A.; Vina A.; Univ. Autonoma de Madrid, Spain; EUROMICRO Conference, Sep. 2–5, 1996, pp. 564–571.

IEEE/IEE Electronic Library; "Techniques for Increasing the Stream Capacity of a Multimedia Server" Jadav, D.; Choudhary, A.; ECE Dept., Syracuse Univ., NY, $3^{rd}$ Intl. Conf. on High Performance Computing, Dec. 19–22, 1996, pp. 43–48.

IEEE/IEE Electronic Library, "MMPacking: A Load and Storage Balancing Algorithm for Distributed Multimedia Servers" Serpanos, D.N.; Georgiadis, L.; Bouloutas, T.; IBM Thomas J. Watson Res. Center, Yorktown Heights, NY; 1996 IEEE Int'l Conf. on Computer Design VLSI in Computers and Processors, Oct. 7–9, 1996, pp. 170–174.

Fibre Channel, Generic Services (FC–GS) Rev. 3.1, dpANS X3.288–199x X3T11/Project 1050D; Working Draft Proposed American National Standard for Information Systems, Aug. 7, 1996, pp. i–xiv, 1–84.

RFC 1910, RFC Archive; "User–Based Security Model for SNMPv2", G. Waters, Editor, Bell–Northern Research Ltd., Feb. 1996, pp. 1–40.

IEEE/IEE Electronic Library, "High–Performance VOD Server AIMS" Nishikawa, K.; Egawa, H.; Kawaki, O.; Inamoto, Y. Fujitsu Labs. Ltd., Kawasaki, Japan; Global Telecommunications Conference, Nov. 13–17, 1995, pp. 795–798.

Fibre Channel Arbitrated Loop (FC–AL) Rev. 4.5; X3.272–199x X3T11/Project960D; Working Draft Proposal American National Standard For Information Technology, Jun. 1, 1995, pp. i–x, 1–92.

IEEE/IEE Electronic Library, "Multimedia Servers–design and Performance" Ghafir, H.; Chadwick, H.; IBM Corp., Bethesda, MD; Global Telecommunications Conference, Nov. 28–Dec. 2, 1994, pp. 886–890.

IEEE/IEE Electronic Library, "Multimedia Storage Servers: A Tutorial" Gemmell, D.J.; Vin, H.M.; Kandlur, D.D.; Venkat Rangan, P.; Rowe, L.A.; Simon Fraser Univ., Burnaby, BC, Canada; Computer, May 1995, pp. 40–49.

IEEE/IEE Electronic Library, "An Observation–Based Admission Control Algorithm For Multimedia Servers" Vin, H.M.; Goyal, A.; Goyal, P.; Dept. of Comput. Sci., Texas Univ., Austin, TX; International Conference on Multimedia Computing and Systems, 1994, May 15–19, 1994, pp. 234–243.

"Symmetrix Model 55XX Product Manual, P/N 200–810–550 Rev D" EMC Corporation, Hopkinton, Mass., May 1994, pp. 1–236.

IEEE/IEE Electronic Library, "Data Organization and Storage Hierarchies in a Multimedia Server" Christodoulakis, S.; Anestopoulos, D; Argyropoulos, S.; Tech. Univ. of Crete, Chania, Greece; Compcon Spring '93, Feb. 22–26, 1993, pp. 596–604.

"Symmetrix Model 55XX Product Manual, P/N 200–810–550 Rev D" Corporation, Hopkinton, Mass,m May 1994, pp. 1–236.

IEEE/IEE Eletronic Library, "Data Organization and Storage Hierarchies in a Multimedia Server" Christodoulakis, S.; Anestopoulos, D; Argyropoulos, S.; Tech. Univ. of Crete, Chania, Greece; Compcon Spring '93, Feb. 22–26, 1993, pp. 596–604.

Lev Vaitzblitr; "The Design and Implementation of a High–Bandwidth File Server for Continuous Media" Thesis, Master of Science, Massachusetts Institute of Technology, Cambridge, Mass., Sep. 1991, pp. 1–95.

J. Case, M. Fedor, M. Schoffstall, J. Davin, "A Simple Network Management Protocol (SNMP)," May 1990, MIT Laboratory for Computer Science, Cambridge, Mass., pp. 1–35.

Ulyless Black, "TCP/IP and Related Protocols", McGraw–Hill, Inc., New York, N.Y., pp. 304–130.

Jadav et al., "Design and Evaluation of Data Access Strategies in a High Performance Multimedia–on–Demand Server," IEEE (1995).

Pan et al., "A Time–Scale Dependent Disk Scheduling Scheme for Multimedia–on–Demand Servers," IEEE (1996).

\* cited by examiner

| STORAGE PORT INDEX | WWN | S_ID | ESTIMATED LOAD |
|---|---|---|---|
| 0 | — | — | — |
| 1 | — | — | — |
| ⋮ | ⋮ | ⋮ | ⋮ |
| 15 | — | — | — |

*Fig. 7*

| LOOP INDEX | HOST INDEX | HOST NAME | WWN | S_ID | BITMAP | ESTIMATED LOAD |
|---|---|---|---|---|---|---|
| 0 | 0 | — | — | — | — | — |
| 0 | 1 | — | — | — | — | — |
| ⋮ | ⋮ | ⋮ | ⋮ | ⋮ | ⋮ | ⋮ |
| 0 | 49 | — | — | — | — | — |
| 1 | 0 | — | — | — | — | — |
| ⋮ | ⋮ | ⋮ | ⋮ | ⋮ | ⋮ | ⋮ |
| 15 | 49 | — | — | — | — | — |

*Fig. 8*

| HOST S_ID MODULUS | LOOP 0 | LOOP 1 | ... | LOOP 15 |
|---|---|---|---|---|
| 0 | — | — | — | — |
| 1 | — | — | — | — |
| ⋮ | ⋮ | ⋮ | ⋮ | ⋮ |
| 63 | — | — | — | — |

*Fig. 9*

| S_ID MODULUS | LISTS OF S_IDs AND ACCUMULATOR TABLE INDICES | |
|---|---|---|
| 0 | (S_ID, INDEX), (S_ID, INDEX) | ... |
| 1 | (S_ID, INDEX), (S_ID, INDEX) | ... |
| ⋮ | ⋮ | |
| 63 | (S_ID, INDEX), (S_ID, INDEX) | ... |

LOAD BALANCING USING DIRECTORY SERVICES IN A DATA PROCESSING SYSTEM

BACKGROUND OF THE INVENTION

1. Technical Field

The present invention relates generally to data processing networks, and more particularly to a data processing network in which a multiplicity of host processors are connected to shared resources.

2. Related Art

In many data processing networks, a large number of host processors share resources such as a database or storage subsystem. Typically, each host has a high probability of obtaining immediate access, but immediate access is not guaranteed. The cost of guaranteeing immediate access is usually considered to be much greater than the benefit to the user.

The probability of obtaining immediate access can be increased by using various techniques. A direct but rather costly solution is to provide additional network paths and additional storage resources, such as additional paths to duplicate storage servers for read-only storage volumes. Other techniques, such as dynamic routing and load balancing, attempt to use existing network and storage resources more effectively.

Dynamic routing directs each data access requests along a path that is selected in accordance with the resources that are currently available in order to avoid overload of resources in the network. Load balancing assigns alternative resources to the hosts in order to avoid overload of any one of the alternative resources by receipt of simultaneous access requests from a large number of the hosts. For dynamic routing and load balancing to be particularly effective, however, additional resources are required in order to gather intelligence about the current or expected state of the network, and to control or restrict the path of the data access requests in a fashion that is beneficial. These additional resources tend to introduce cost and complexity into the data network and often reduce performance during usual operating conditions.

SUMMARY OF THE INVENTION

In accordance with one aspect of the invention, there is provided a method for controlling access of host processors to alternative shared resources in a data network. The method includes storing in a directory a specification of a respective subset of the alternative shared resources which are accessible to each of the host processors, and operating a directory service for accessing the directory in response to a request from each host processor for reporting to each host processor a set of network addresses of the alternative shared resources for each host processor. The set of network addresses of the alternative shared resources for each host processor including only the network addresses of the alternative shared resources in the respective subset of the alternative shared resources which are accessible to each host processor. The method further includes operating each host processor including each host processor sending a request to the directory service for a report of network addresses of the alternative shared resources, and receiving from the directory service a report of the set of network addresses of the alternative shared resources for the host processor; and then the host processor commencing a sequence of data processing operations during which the host processor transmits service requests to at least one network address in the set of network addresses of the alternative shared resources for the host processor.

In accordance with another aspect of the invention, there is provided a method of controlling access of host processors to ports of a storage subsystem in a data network including a switch linking the host processors to the ports of the storage subsystem. The method includes storing in a directory a specification of a respective subset of the ports of the storage subsystem which are accessible to each of the host processors, and operating a directory service for accessing the directory and for reporting to each host processor the respective subset of the ports of the storage subsystem which are accessible to the host processor. The method further includes operating each host processor including each host processor sending a request to the directory service for a report of the respective subset of ports of the storage subsystem which are accessible to the host processor; and receiving from the directory service a report of the subset of the ports of the storage subsystem which are accessible to the host processor. Then the host processor commences a sequence of data processing operations during which the host processor transmits storage access requests to at least one port included in the respective subset of ports of the storage subsystem which are accessible to the host processor.

In accordance with another aspect of the invention, there is provided a digital computer programmed to providing a directory service in a data network. The digital computer is programmed with a configuration database of information about host processors in the network and shared resources in the network that are accessible to the host processors. The configuration database further includes information specifying, for each host processor, a respective subset of the shared resources which are accessible to the host processor. The digital computer is programmed to respond to a request from each host processor for information about resources in the network by reporting to the host processor information about the respective subset of the shared resources that are accessible to the host processor, thereby selectively restricting access of the host processors to the shared resources.

In accordance with yet another aspect of the invention, there is provided a machine readable program storage device containing a program for programming a digital computer to providing a directory service in a data network. The directory service accesses a configuration database of information about host processors in the network and shared resources in the network and information specifying for each host processor a respective subset of the shared resources which are accessible to the host processor. The directory service responds to a request from each host processor for information about resources in the network by reporting to each host processor information about the subset of the shared resources that are accessible to the host processor, thereby selectively restricting access of the host processors to the shared resources.

In accordance with still another aspect of the invention, there is provided a storage network that includes a cached storage subsystem and a switch for routing data access requests from a plurality of host processors to the cached storage subsystem. The cached storage subsystem includes a plurality of storage devices, a cache memory linked to the storage devices for filling the cache with data from the storage devices, and a plurality of port adapters providing storage ports for access to the cache memory. The switch has a plurality of network ports and is linked to the storage ports for selectively routing data access requests from the network ports to the storage ports. The network ports are connectable for receiving the data access requests from a plurality of host processors. The storage network further includes a digital computer programmed with a configuration database of information about the host processors and the storage ports. The configuration database further includes information specifying, for each host processor, a respective subset of the storage ports which are accessible to the host processor. The digital computer is programmed to respond to a request from each host processor for information about the storage ports by reporting to the host processor information about the respective subset of the storage ports which are accessible to the host processor, and thereby selectively restrict access of the host processors to the storage ports.

BRIEF DESCRIPTION OF THE DRAWINGS

Other objects and advantages of the invention will become apparent upon reading the following detailed description with reference to the accompanying drawings wherein:

FIG. 7 is a table of storage port information used and maintained by the digital computer providing the directory services of the data network FIG. 8 is a table of host information used and maintained by the digital computer providing directory services of the network;

FIG. 9 is a table of accumulator values that could be used by the digital computer in the switch for determining the loading of each host on the storage subsystem;

Figure 1:
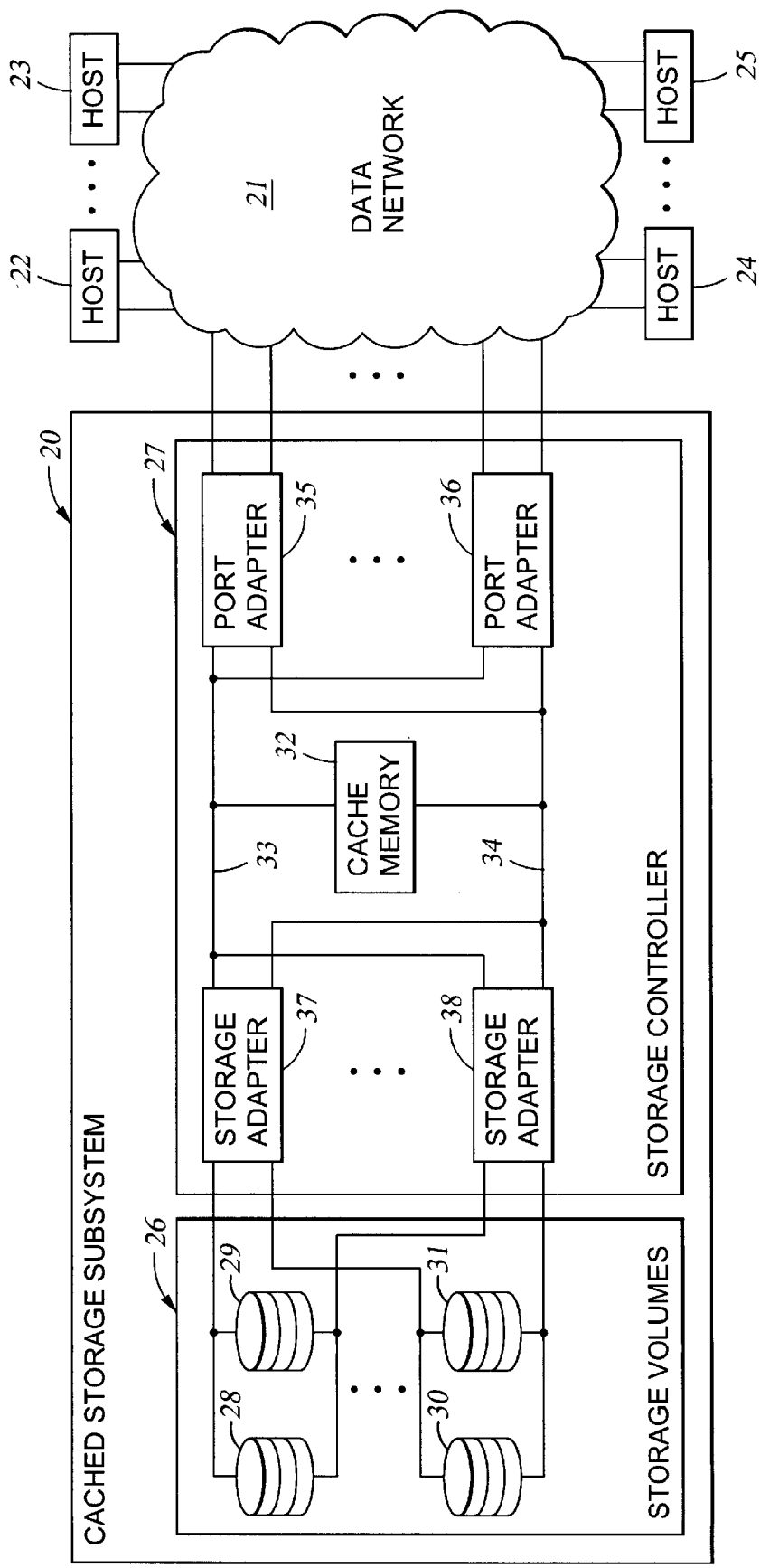
FIG. 1 is a block diagram of a data processing system including a cached storage subsystem linked by a data network to a multiplicity of host processors.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF THE PREFERRED EMBODIMENTS

With reference to FIG. 1 of the drawings, there is shown a cached storage subsystem 20 connected via a data network 21 to a plurality of hosts 22, 23, 24, 25. The cached storage subsystem 20 includes storage volumes 26 and a storage controller 27 for controlling access of the hosts to the storage volumes. The storage volumes are logical units of storage distributed over one more storage devices 28, 29, 30, and 31. The storage devices are magnetic disk drives, optical disk drives, tape drives, solid-state memory devices, or other storage devices capable of providing nonvolatile data storage. Presently the preferred storage devices are magnetic disk drives each having a storage capacity of at least 47 gigabytes.

The storage controller 27 includes a dual port cache memory 32, a plurality of port adapters 35, 36, and a plurality of storage adapters 37, 38. The cache memory 32 is accessed via any one of two back-plane busses 33, 34. Each of the port adapters 35, 36 link the data network 21 to each of the two back-plane busses 33, 34. Each of the storage adapters 37, 38 links a respective set of the storage devices 28, 29, 30, 31 to each of the two back-plane busses 33, 34. For example, the cached storage subsystem includes up to eight storage adapters and up to eight port adapters, and each port adapter provides two independent data ports to the data network.

When a port adapter 35 or 36 receives a storage access request from one of the hosts 22, 23, 24, 25, the port adapter accesses a directory in the cache memory 32 to determine whether or not the data to be accessed resides in the cache memory. If the data to be accessed resides in the cache memory, then the port adapter accesses the data in the cache memory. If the data to be accessed does not reside in the cache memory, then the port adapter forwards a storage access request to the storage adapters 37, 38. One of the storage adapters 37, 38 responds to the storage access request by performing a logical-to-physical translation to determine where the data to be accessed resides on the storage devices, and reads the data from the storage devices and writes the data to the cache memory, for access by the port adapter. The storage adapters 37, 38 also perform a write-back operation to ensure that that data written to the cache memory 32 by the port adapters eventually becomes written to the storage volumes 26.

The cache memory 32 ensures that data frequently accessed by the hosts is likely to be found in cache in order to avoid the data access time of the storage devices and in order to minimize loading on the storage adapters and the port adapters. Consolidation of network storage into a large cached storage subsystem provides a benefit that cache resources are consolidated into one large cache, which is more efficient than a number of smaller caches having in total the same cache memory capacity. A large cache is more likely to contain the most recently accessed data than the combined cache memory of the smaller caches.

The storage subsystem 20 is constructed for high data availability so that a single high-capacity storage subsystem is at least as fault-tolerant as a local collection of conventional network storage servers. Fault tolerance is ensured by dual, redundant components and busses in the path from any one of the port adapters 35,36 to any one of the storage devices 28, 29, 30, and 31. Mirroring or RAID (redundant array of inexpensive disks) techniques ensure that the storage adapters 37, 38 can recover data in the event of failure of any one of the storage devices. In a similar fashion, the data network 21 can be made fault tolerant by ensuring that each of the hosts 22, 23, 24, 25 has independent paths through the data network 21 to each of two of the port adapters 35, 36.

In a preferred form of construction, the cache memory 32 is composed of dynamic RAM memory cards mounted in a card-cage or main-frame, and the port adapters and storage adapters are programmed micro-processor cards that are also mounted in the card-cage or main-frame. Each port adapter 35, 36 has one or more processors for handling the communication protocol of the data network 21 and communicating with the cache memory busses 33, 34. Each storage adapter 37, 38 has one or more processors for handling the communication protocol of the storage devices and for communicating with the cache memory busses 33, 34. For example, the links between the storage adapters 37 and the storage devices 28, 29, 30, and 31 are FWD (fast, wide, differential) SCSI or Fibre Channel fiber-optic loops. The port adapters 35, 36 can be programmed to communicate with the network via any number of communication and/or network protocols, such as Bus and Tag CKD, ESCON, SCSI, Ethernet, FDDI, ATM, DS1, DS3, T3, TCP, UDP, NFS, SNMP, and Fibre Channel. Further details regarding the preferred construction and operation of the cached storage subsystem 20 are disclosed in Yanai et al., U.S. Pat. No. 5,206,939, issued Apr. 27, 1993; Yanai et al. U.S. Pat. No. 5,335,352, issued Aug. 2, 1994; and Yanai et al. U.S. Pat. No. 5,381,539, issued Jan. 10, 1995; all incorporated herein by reference.

Figure 2:
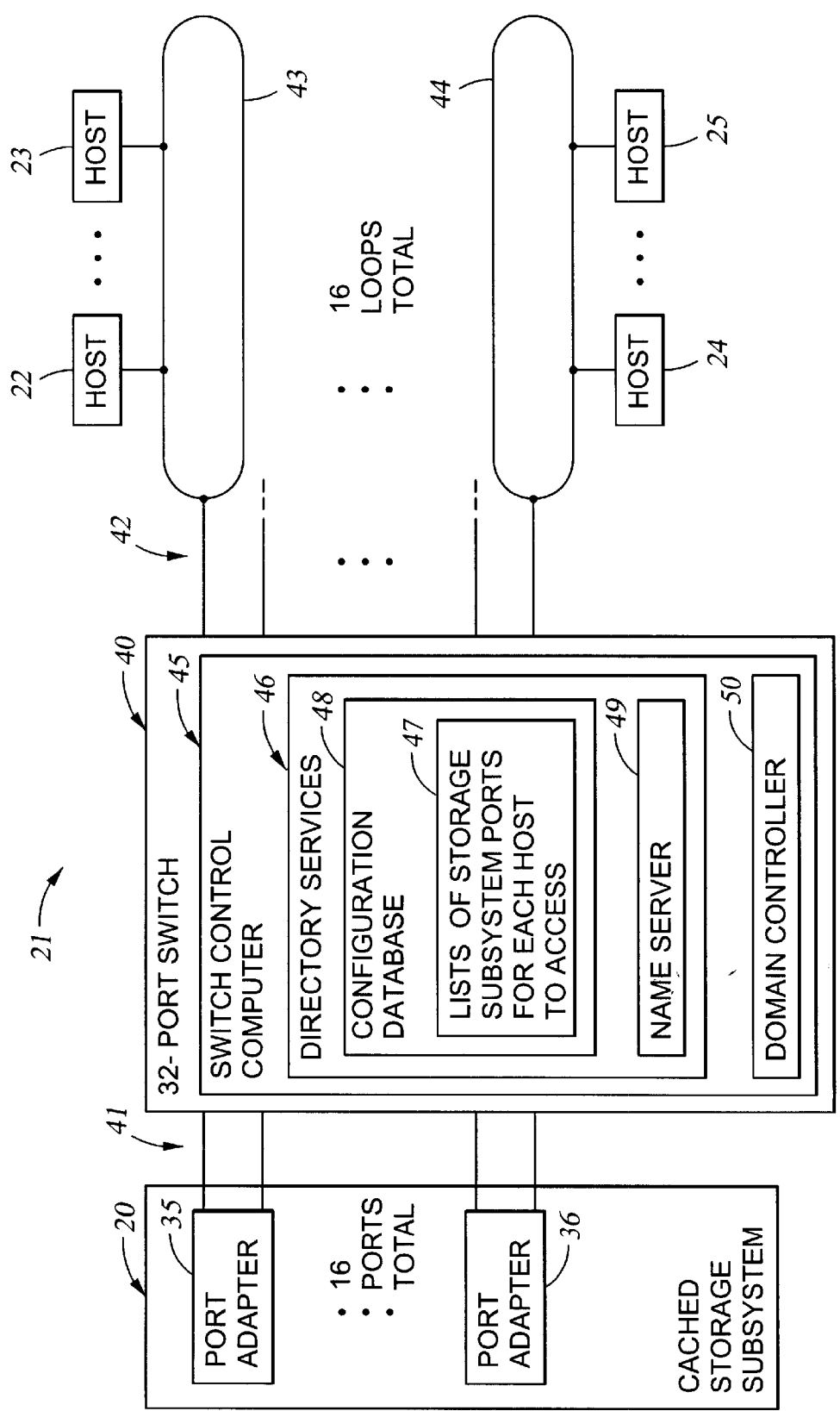
FIG. 2 is a block diagram of the data processing system of FIG. 1 further showing that the data network includes a number of loops and a switch connecting the loops to ports of port adapters of the storage subsystem.

Referring to FIG. 2, the data network is shown having a 32-port switch 40 for simultaneously connecting any one of sixteen storage ports 41 of the port adapters 35, 36 in the storage subsystem to any one of sixteen loop ports 42 of sixteen loops including loops 43 and 44. Each of the sixteen loops 43, 44 has loop ports of up to fifty hosts such as the hosts 22, 23 linked in loop 43 and the hosts 24, 25 linked in the loop 44.

The switch 40 is used in the data network 21 to permit any of the hosts to access any of the storage ports. This is done to reduce the likelihood that storage port overload will prevent a host from obtaining immediate access to storage in the cached storage subsystem. Because the same storage in the storage subsystem can be accessed from any of the storage ports, a host that sends a storage access request to a storage port and receives a busy response from the switch 40 can send the storage access request to any other storage port.

The likelihood of storage port overload preventing a host from obtaining immediate access to storage in the cached storage subsystem can be reduced still further if not all of the hosts have access to all of the storage ports, so long as this reduction in access is based on balancing of the loading characteristics of the hosts. This is especially true if it is desired to permit some of the hosts to have priority over others, so that under high loading conditions, the higher priority hosts can continue to have immediate access at the expense of the lower priority hosts which are denied immediate access. The introduction of load balancing into a data processing system as shown in FIG. 2, however, typically involves a good deal of complexity.

In the data processing system of FIG. 2, load balancing is accomplished by the use of directory services for communicating to each host the subset of the storage ports that the host may access. This has the advantage that load balancing can be incorporated into the data processing system without modification of the hardware or routing procedure of the switch 40, and with minimal modification of the switch software or the host software. In particular, for the data processing system of FIG. 2, no modification of the host software is used, and there is minimal modification of conventional software for the switch. The switch 40 has a switch control computer 45, and the switch control computer is programmed to provide directory services 46 for the data network 21. The modification of the conventional software for the switch includes the addition of lists 47 of storage subsystem ports for each host to access, and modification of the directory services program 46. The lists 47 reside in a configuration database 48 for the directory services program 46. The modification of the directory services program 46, for example, is done by loading a new version of the program into the switch control computer 45 from a machine readable program storage device such as a conventional floppy disk (not shown).

In a conventional directory services program, the switch control computer is instructed to respond to a name server request from a host by providing the host with a list of all the storage ports that are accessible to the host through the switch. For example, the data network 21 is constructed to operate substantially in accordance with the Fibre Channel standards currently being developed by the American National Standards Institute (ANSI). In a Fibre Channel network, each port has a 64-bit port identifier called a "World Wide Name" (WWN). To ensure that the WWN is unique, for example, it may include a unique identifier of the manufacturer of the device including the port (e.g., an Organizationally Unique Identifier as registered with the IEEE in New York, N.Y.), and the manufacturer's serial number of the device. The WWN is too long, however, to be used for source and destination addresses of request and responses transmitted over the network. Therefore, the Fibre Channel standards specify that each port is assigned a temporary address that is unique to the configuration of the network at any given time, but not necessarily unique to each port for all time. Information is transmitted over a Fibre Channel network in fixed-length packets called "Frames", and each Frame includes a source address (S_ID) which is the temporary address of the source of the frame, and a destination address (D_ID) which is the temporary address of the destination of the frame.

When a Fibre Channel network has a switch such as the switch 40 in FIG. 2, the network is provided with a directory service called a "name server" 49 that manages the reporting of the temporary addresses for the ports connected by the network. The name server 49 has a predefined address on the fabric. A "domain controller" 50 in the switch 40 assigns the temporary address to each network port when the port "logs in" to the fabric. Each temporary address assigned by the domain controller 50 is reported to the name server 49. During or after fabric login, the network port can interrogate the name server 49 about other ports that are connected in the network. In particular, for a network configuration as shown in FIG. 2, a "name server" 49 in accordance with the Fibre Channel specifications would permit a host on a loop to obtain the temporary address of each port on its own loop and each port accessible to the host through the switch. The ports accessible to each host through the switch would include the ports of the port adapters of the storage subsystem, and the ports of the hosts on other loops.

In the directory services program 46 of FIG. 2, the switch control computer 45 provides directory services for the network, including the name server 49. However, the name server does not necessarily provide a host with a list of all the storage ports accessible to the host through the switch. Instead, the switch control computer 45 is instructed to respond to a name server request from a host for the ports accessible through the switch by providing the host with a respective one of the lists 47, which defines for each host a respective subset of the storage ports that the host should access through the switch.

The host makes the name server request when the host logs into the network, and thereafter commences a sequence of data processing operations during which the host transmits storage access requests to the storage ports that were specified by the switch in response to the name server request. For example, if the switch specified only one storage port for the host to access through the switch, then the host would direct each of its storage access requests to only that single storage port. If the switch specified a plurality of storage ports for the host to access through the switch, then the host would direct its storage access requests in round-robin fashion to the plurality of storage ports. In other words, if the switch specified storage ports 1, 5, and 7, in response to a name server request, the host would direct its first storage access request to storage port 1, its second storage access request to storage port 5, its third storage access request to port 7, its fourth storage access request to storage port 1, its fifth storage access request to storage port 5, etc.

Figure 3:
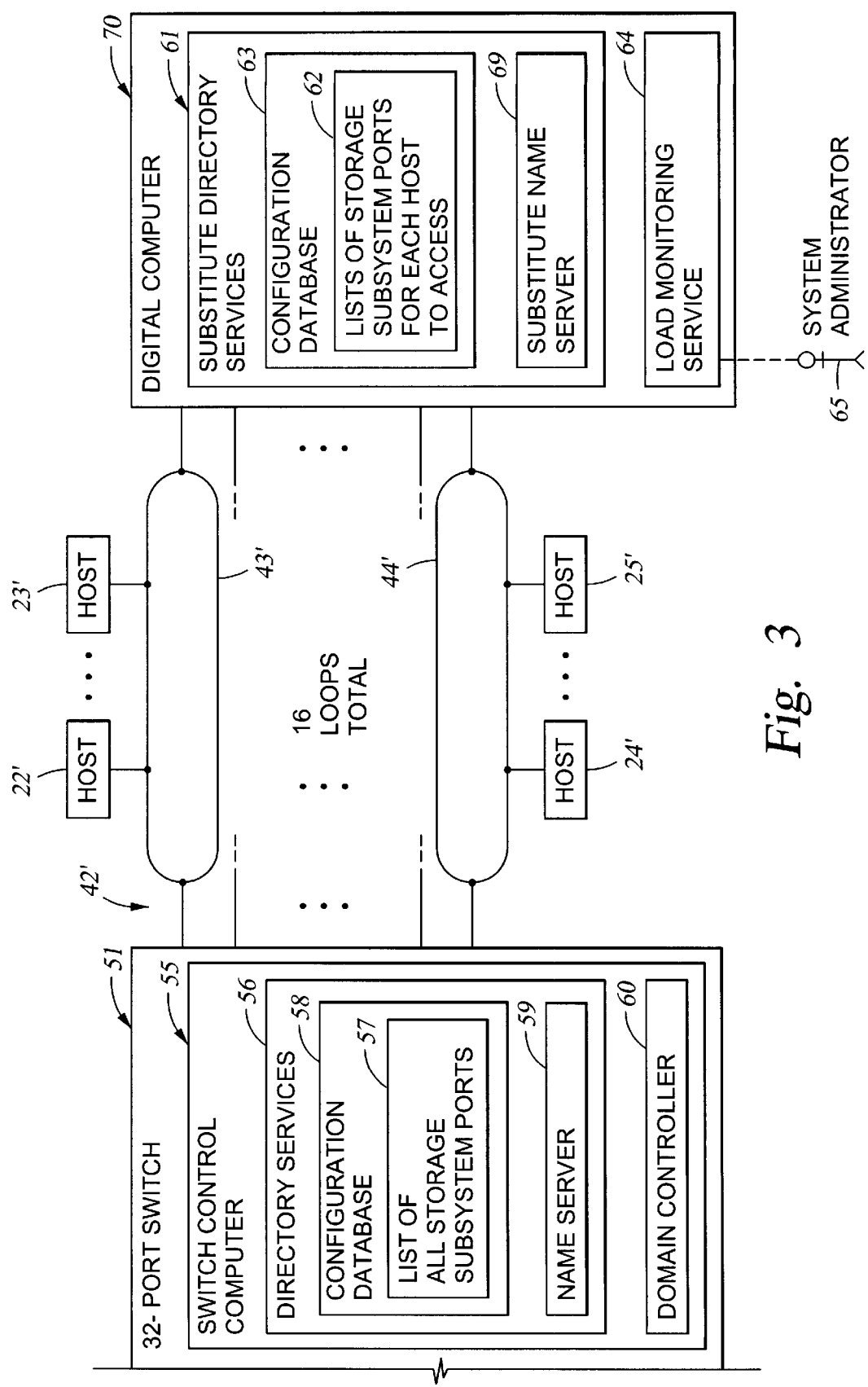
FIG. 3 is a block diagram of an alternative embodiment of the invention that is similar to the data processing system of FIG. 1 but with the use of a conventional switch and the addition of a digital computer for monitoring activity of the hosts and providing a substituted name server directory for the network in lieu of the name server directory provided by the conventional switch.

FIG. 3 is a block diagram of an alternative embodiment of the invention that is similar to the data processing system of FIG. 1 and FIG. 2 but with the use of a conventional switch 51 in lieu of the switch 40 of FIG. 2 and the addition of a digital computer 70 for monitoring activity of the hosts and providing substitute directory services 61 including a substitute name server 69 for the network in lieu of the directory services 56 and name server 59 provided by the conventional switch 51. Components in FIG. 3 which are similar to components in FIG. 2 are denoted with similar but primed reference numerals. The switch 51 is similar to the switch 40 of FIG. 2 in that it also has a switch control computer 55, directory services 56, and a configuration database 58, name server 59, and domain controller 60, but it is different in that its directory services 56 respond to a name server request by returning a single list 57 of all the storage subsystem ports.

The only difference that there need be between a conventional switch or conventional host software and the switch 51 and host software in the data processing system of FIG. 3 is a difference that causes the substitute directory services 61 of the digital computer 70 instead of the directory services 56 of the switch 51 to respond to a name server request from a host. For example, the network address at which the directory services 56 of the switch control computer 55 receive name server requests can be different from the conventional name server address, or the host software can be programmed so that the host name server requests specify a name server address of the substitute name server 69 in the substitute directory services 61 in the digital computer 70 instead of the conventional name server address. However, it is not necessary that all of the hosts send their name server request to the substitute directory services 61 instead of the directory services 56 in the switch 51. For example, certain privileged hosts could be programmed to send their name server requests to the conventional name server 59 in the directory services 56 in the switch 51 so that the privileged hosts will access all of the storage ports and therefore have priority over the other hosts that are programmed to send their name server request to the substitute directory services 61.

The substitute directory services 61 could either duplicate the functions of the directory services 56 of the switch 51, or could act as a proxy for the hosts to use most of the functions of the directory services 56 so as to avoid duplication of programming for these functions. For example, conventional directory services automatically search the data network for devices linked to the data network, poll the devices for device names, assign unique network addresses to each device, and store this information in a configuration database. Instead of duplicating these functions, the substitute directory services 61 could login to the directory services 56 of the switch 51, obtain a copy of the configuration database 58 in the switch 51, and register with the directory services 46 to be notified of any network "state change" detected by the directory services 46. Upon being notified of any such network state change, the substitute directory services would update its copy 63 of the configuration database 58 to reflect the new state of the network. The substitute directory services 61 would act as a proxy for a host when receiving a network login request from the host, by forwarding the login request to the directory services 46, receiving the reply from the directory services 46, modifying the reply where appropriate (for example, by substituting a respective one of the lists 62 for the list 57), and forwarding the reply to the host.

The digital computer 70 can be a conventional commodity computer having plug-in cards (not shown) for interfacing with the loops 43', 44', and a disk drive (not shown) for reading its directory services program from a conventional floppy disk (not shown). Because host logins and network state changes consume a small fraction of the available processing time of the computer 70, the computer can be programmed to provide additional foreground and background tasks. For example, the computer 70 is programmed to provide a load monitoring service 64 that includes a foreground activity monitoring task having a lower priority than the substitute directory services 61, and a background task of computing and displaying load statistics and diagnostic information to a system administrator 65.

Figure 4:
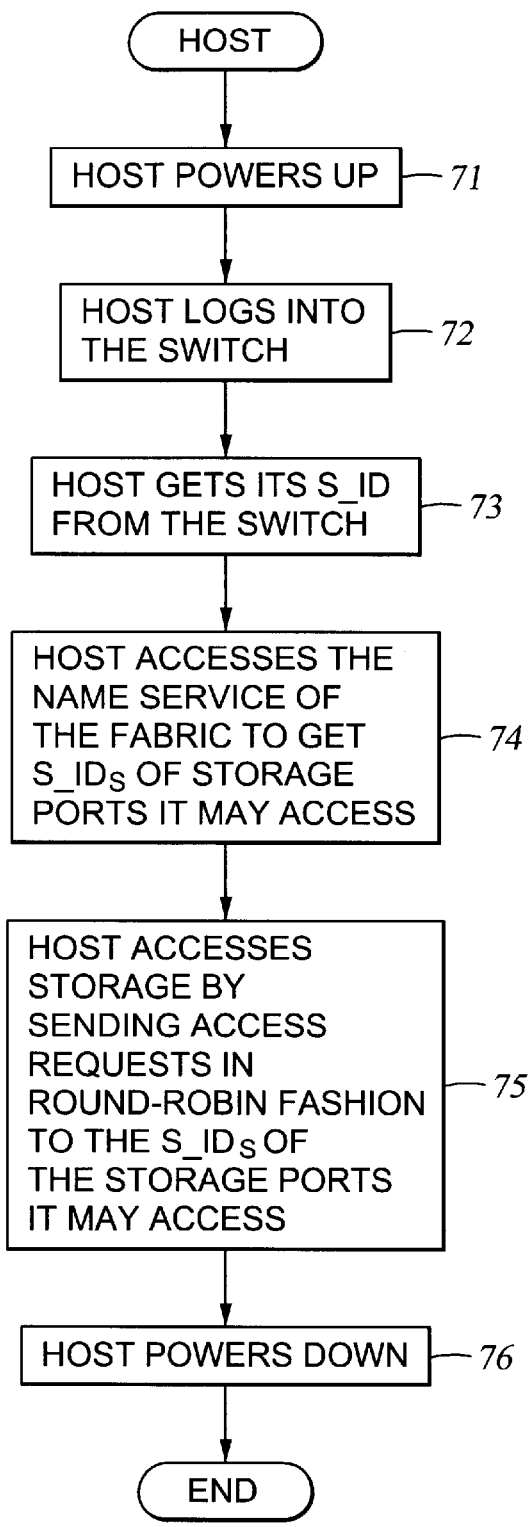
FIG. 4 is a flowchart showing how a host uses the directory services to direct its data access requests to a subset of the storage ports as specified by the directory services.

FIG. 4 is a flowchart showing how a host uses the directory services to direct its data access requests to a subset of the storage ports as specified by the directory services. In a first step 71, the host powers up. Then in step 72, the host logs into the switch by sending a login request to the directory services of the network. The directory services respond to the login request by assigning a unique network address (S_ID) to the host. In step 73, the host receives its S_ID. Then in step 74, the host accesses the name server of the network to get the unique network addresses (S_IDs) of the storage ports that the host may access. In step 75, the host accesses storage by sending storage access requests in round-robin fashion to the S_IDs of the storage ports that the host may access. Finally, in step 76, the host powers down.

Figure 5:
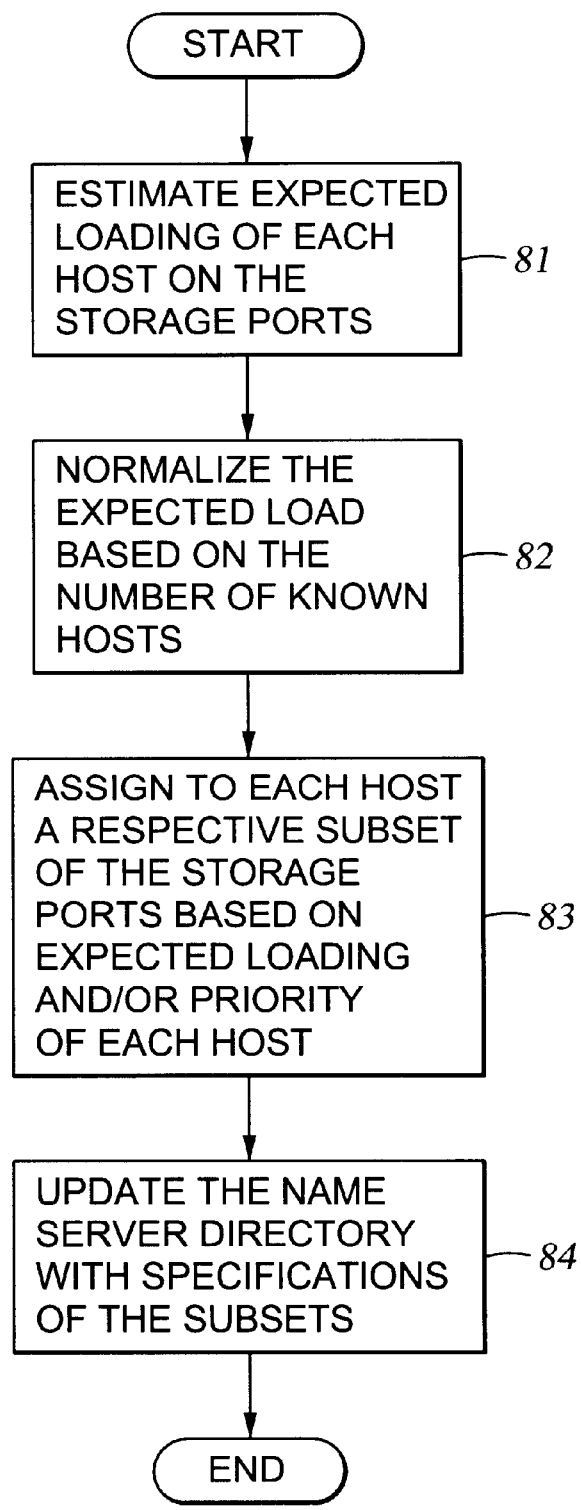
FIG. 5 is a flowchart of a procedure used for initially determining the subsets of the storage ports to be specified by the directory services.

FIG. 5 shows a flow chart of a procedure used for initially determining the respective subsets of the storage ports that the hosts should access. In a first step 81, an estimate is made of the expected loading of each host on the storage ports. For example, the system administrator obtains information about the hosts and the users of the hosts in the network, and the system administrator assigns a number to each host giving a rough estimate of the expected load based on the processing capability of the host and the use that the user is expected to make of the host. Then in step 82, the expected load is normalized by summing all of the assigned load numbers, and dividing each assigned load number by the total load. Then in step 83, a respective subset of the storage ports is assigned to each host based on the expected loading and/or the priority of each host. For example, the system administrator assigns a priority number from 1 to 16 specifying the number of storage ports that each host may access. This number determines the priority of the host where the number 1 indicates the lowest priority and the number 16 indicates the highest priority. Then the following procedure is used to determine a respective subset of the storage ports for each host:

```
COMMENTS:
    NPORTS is the number of storage ports
        Storage Ports 1 and 2 are on a first port adapter,
        Storage Ports 3 and 4 are on a second port adapter, etc.
    NHOSTS is the number of hosts
    PORTLOAD is the estimated load allocated to each port
    BITMAP is a bitmap array including for each host a string
        of bits indicating
    which storage ports are allocated to each host
    HOSTLOAD is the load estimated for each host
    PRIORITY is the number of storage ports to be allocated
        to each host.
FOR I=1 TO NPORT
    PORTLOAD(I)=0
    FOR J=1 TO NHOSTS
        CLEAR BITMAP(J,I)
    END
END
FOR J=1 TO NHOST
    FOR K=1 TO PRIORITY(J)
        I=MIN(PORTLOAD, BITMAP, J, NPORTS, K)
        SET BITMAP(J,I)
        PORTLOAD(I)=PORTLOAD(I)+HOSTLOAD(J)/
            PRIORITY(J)
    END
END
```

The MIN function finds one storage port to assign to Host no. J.

```
FUNCTION MIN(PORTLOAD, BITMAP, J, NPORTS, K)
    MAXVALUE is a constant that has the maximum possible value.
    ACC is a temporary variable for finding a minimum
        storage port loading value for storage ports that are not
        yet assigned and that might be assigned to Host no.J
    ACC=MAXVALUE
    ODD is a flag for indicating whether the storage port
        index I is odd or even.
    SET ODD TO FALSE
    FOR I=1 TO NPORTS
        ODD=NOT ODD
    The next line of code prevents a port from being allocated
        twice to a host.
    IF BITMAP(J,I) THEN NEXT I
    The next three lines of code prevent a host processor from
        being assigned to both ports of the same port adapter so
        far as possible; i.e., so long as the priority is less than
        or equal to half the number of ports.
    HALF=NPORTS/2
    IF K<=HALF AND ODD AND BITMAP(J,I+1)
        THEN NEXT I
    IF K<=HALF AND NOT ODD AND BITMAP(J,I-1)
        THEN NEXT I
    IF ACC >PORTLOAD(I) THEN (ACC=PORTLOAD
        (I), MIN=I)
END
```

Finally, in step 84, the name server directory is updated with the specifications of the subsets.

In order to better balance the loading of the hosts on the storage ports, the actual loadingcan be monitored and the respective subsets of storage ports assigned to the hosts can be changed based on the actual loading. For example, the actual loading could be monitored by the cached storage subsystem, by the switch, by the hosts, or by the load monitoring service 64 of the digital computer 70 shown in FIG. 3. Then the procedure of FIG. 5 could be performed over again to determine new specifications for the respective subsets and better balance the loading. However, this should be done when most of the hosts are logged off the network to avoid a transient imbalance condition. Alternatively, the procedure of FIG. 6 could be used to determine a new subset for a host when the host logs into the network.

Figures 6, 10:
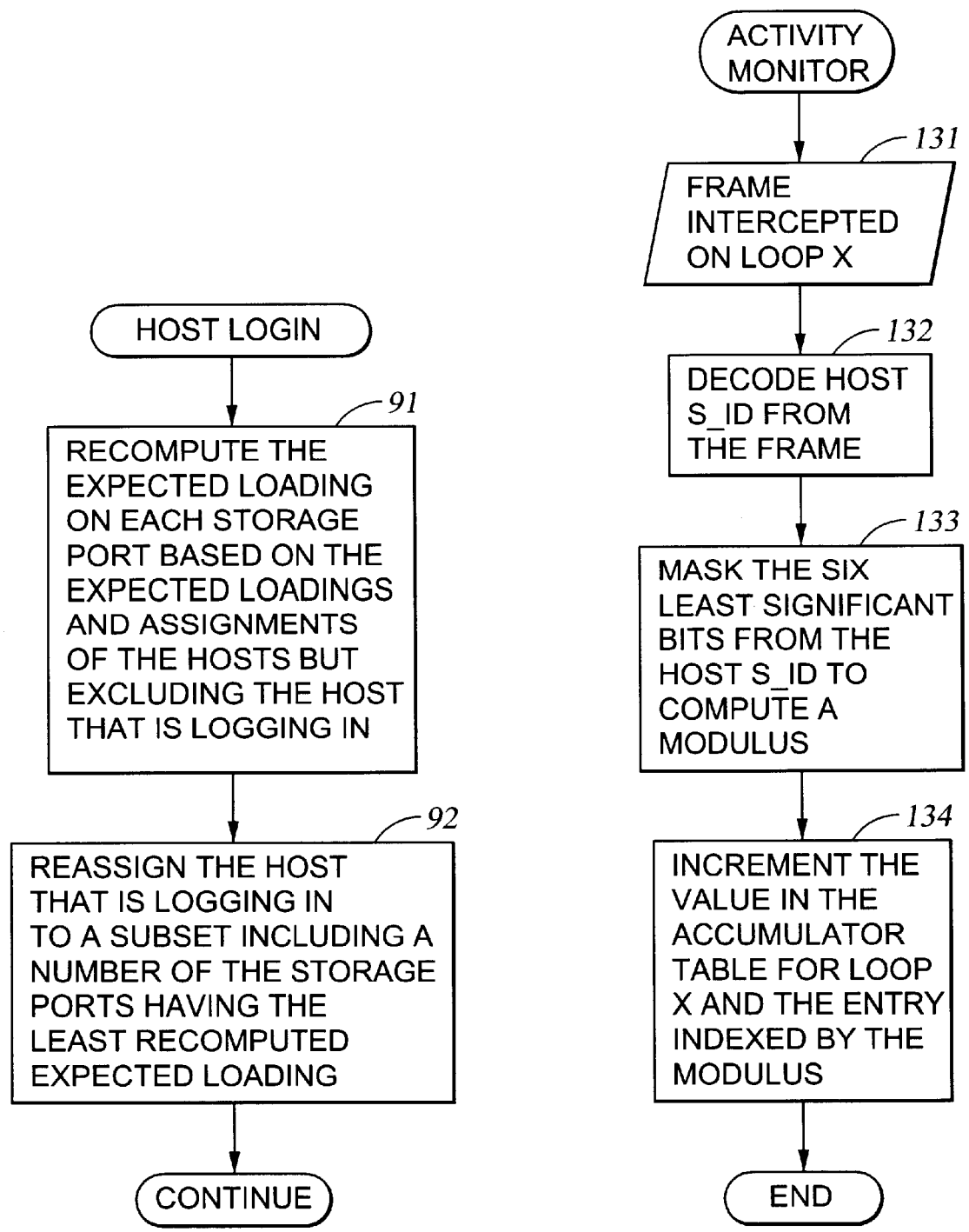
FIG. 6 is a flowchart of a procedure used when a host logs into the data network for updating the subsets of the storage ports to be specified by the directory services.
FIG. 10 is a flowchart of a procedure that could be used by the digital computer in the switch for determining the loading of each host on the storage subsystem.

With reference to the flowchart in FIG. 6, in a first step 91 the expected loading on each of the storage ports is recomputed based on the expected loadings and assignments of all of the hosts excluding the host that is logging in. For example, the expected loading on each storage port is computed as the summation of the normalized expected loading of each host that is currently permitted to access the storage port excluding the host that is logging in divided by the respective number of storage ports that said each host is permitted to access. Then in step 92 the host that is logging in is assigned to a subset including its assigned priority number of the available storage ports having the least recomputed expected loadings. The reassigned subset is then updated in the configuration database of the directory services accessed by the host that is logging in, and the routine is finished. For example, steps 91 and 92 could use the following code similar to the code listed above, where JLOGIN is the index of the host logging in:

```
FOR I=1 TO NPORTS
    PORTLOAD(I)=0
    FOR J=1 TO NHOSTS
        IF J=JLOGIN THEN NEXT J
        IF BITMAP(J,I) THEN PORTLOAD(I)=
            PORTLOAD(I)+HOSTLOAD(J)/PRIORITY(J)
    : END
END
J=JLOGIN
FOR I=1 TO NPORTS
    CLEAR BITMAP(J,I)
END
FOR K=1 TO PRIORITY(J)
    I=MIN(PORTLOAD, BITMAP, J, NPORTS, K)
    SET BITMAP(J,I)
    PORTLOAD(I)=PORTLOAD(I) +HOSTLOAD(J)/
        PRIORITY(J)
END
```

Turning now to FIGS. 7 to 9, there are shown a number of random access memory tables that could be used by the directory services. FIG. 7 shows a table 100 in the configuration database for storing storage port information. The table 100 includes an entry for each of the sixteen storage ports. The table 100 includes a first column for the worldwide name (WWN) of the storage port, a second column for the unique network address assigned to the storage port (S_ID), and a third column for the estimated load of the hosts on the storage port.

With reference to FIG. 8, there is shown a table 110 for storing host information in the configuration database. Each entry in the table 110 has an associated group index and host index, so that the table 110 includes in effect a sub-table of host information about the hosts on each loop of the network. For example, each loop may include up to 50 hosts, so that the host index ranges from 0 to 49. The loop index ranges from 0 to 15 for the sixteen loops in the network of FIG. 2 or FIG. 3. Each entry in the table 110 includes, for each host, a host name, a WWN, a S_ID, a bitmap, and an estimated load. The host name is included for convenience of the system administrator since the WWN is merely a long string of numbers that happens to be programmed into port circuitry of the host. The host name, for example, is a descriptive name that could indicate a unique physical location for the host or a unique name of a user assigned to the host. If the port circuitry of a host were changed, the WWN programmed into that circuitry would also change, but the host name could remain the same. The S_ID is the unique network address assigned to the host by the directory services. The bitmap is a string of sixteen contiguous bits (i.e., two contiguous bites) when each respective bit is set or not set to indicate whether or not each storage port is included in the subset assigned to the host. The storage port index for the entry of the storage port in the Table 100 of FIG. 7 is the bit address of a bit in the bitmap indicating whether or not a particular storage port is or is not included in the subset. The estimated load in the table 110 of FIG. 8 is the normalized storage port loading that is estimated for the host.

With reference to FIG. 9, there is shown a table 120 of accumulator values. The table 120 can be used by the switch control computer 45 in FIG. 2 to monitor the loading of the hosts on the storage ports. For example, the S_IDs of the hosts on any one of the loops are assigned consecutive numbers. Therefore, when the switch 40 receives a request from any one loop, the lower eight bits of the S_ID identifies a unique one of the hosts on the loop. When the switch 40 receives a request from the loop 44 it can record the frequency of the requests from each host by incrementing an accumulator value in a row of the table 120 corresponding to the six least significant bits of the S_ID of the source address in the request, and in the column of the table 120 corresponding to the particular loop from which the switch 40 received the request. In a similar fashion, when the switch transmits a reply to a loop, the switch can record the occurrence of the reply by implementing an accumulator value in the row of the table 120 corresponding to the least significant six bits in the destination address of the reply and the column corresponding to the loop. For a system in which data is exchanged between the hosts and the storage ports in fixed length packets, the number of packets to or from a host will be recorded in a respective cell of the table 120 for each of the hosts.

Referring to FIG. 10, there is shown a specific example of an activity monitor routine that could use the Table 120 of FIG. 9. In a first step 131 of FIG. 10, a frame is intercepted on a particular loop that will be designated as loop X. The frame is intercepted when the switch either receives the frame from a host on the loop or the switch transmits a frame to a host on the loop. In step 132, the switch control computer decodes the host S_ID from the frame. When the frame is being transmitted to the loop the host S_ID is the destination address of the frame, and when the frame is received from the loop, the host S_ID is the source address in the frame. Then in step 133 the switch control computer masks the six least significant bits from the host S_ID to compute a modulus. Finally, in step 134, the switch control computer increments the value in the accumulator table for the loop X and the table entry indexed by the modulus. The values in the accumulator table 120 have a sufficient number of bits so that overflow does not occur from a time that all the accumulator values are initially set to a later time that they are all read and again reset by a periodic timer interrupt routine.

The switch control computer 45 can easily monitor the loading on each storage port by incrementing a respective counter value for each storage port upon intercepting a data packet transmitted or received from the storage port.

The digital computer 70 can monitor the loading by each host in a similar fashion, but it must determine whether a data packet on a loop was either transmitted or received by a host. This can be done using a kind of hash table 140 shown in FIG. 11. The digital computer 70 executes the routine of FIG. 10 for each source address and each destination address in each data packet intercepted from each loop, and indexes the hash table of FIG. 11 with the modulus rather than directly addressing a table of accumulated values. A hash table is used because the source address or destination address of a data packet intercepted from a loop could be the network address of a storage port rather than a network address of a host. It is possible for at most one network address and at most one host address to have the same S_ID modulus. No two storage ports have the same S_ID modulus because the sixteen storage ports are assigned consecutive network addresses by the directory services. The digital computer 70 indexes the hash table 140 with the S_ID modulus of the source or destination address in the frame and obtains at most two S_ID values and corresponding indices in the indexed table entry. The digital computer compares the S_ID of the source or destination address in the frame to the S_ID values in the list of the entry, and if there is a match with the S_ID in the list, the digital computer obtains the index, and uses it to index a table of accumulators including a sub-table of accumulators for the hosts in the loop and a sub-table of accumulators for the storage ports. In this fashion, the digital computer 70 can monitor the loading of each host and the loading on each storage port.

While a specific example has been described having a data network including one switch and a multiplicity of loops, it should be apparent to a person of ordinary skill that the data network can have a more complex topology. Although loops 43, 44 in FIG. 2 and loops 43', 44' are shown in FIG. 3 for connecting a plurality of hosts to a respective 32-port switch 40, 51, it should be readily apparent that one or more of these loops could be replaced by a switch. In general, for a given number of ports on a loop or switch, a loop is less expensive and is preferred so long as the loop can handle the bandwidth requirements of possible concurrent access by the hosts on the loop. For example, in certain bandwidth intensive applications, such as interactive video applications, it may be preferable to use a switch in lieu of a loop. If one host has much more demanding bandwidth requirements than the other hosts, it may be desirable to connect the one host directly, via a private link, to a respective one of the ports of the 32-port switch. Under such circumstances, in order to provide additional ports for such direct connections, it may be desirable to use a switch having more than 32 ports in lieu of the 32-port switch in FIG. 2 or FIG. 3. Therefore, the present invention is applicable to a wide variety of network topologies that could be used to satisfy diverse storage requirements of different kinds of host computers and different kinds of host applications.

It is also possible for a more complex network to have more than one path through which each host could access a storage port. In this case, the directory services for the network could not only indicate to a host a subset of storage ports that each host should access, but also a subset of paths that the host should use to access. The subset of storage ports and subset of paths could be reported to each host as a list of path names including the names or network addresses of intermediate nodes or ports along each path to each storage port.

Figures 11, 12:
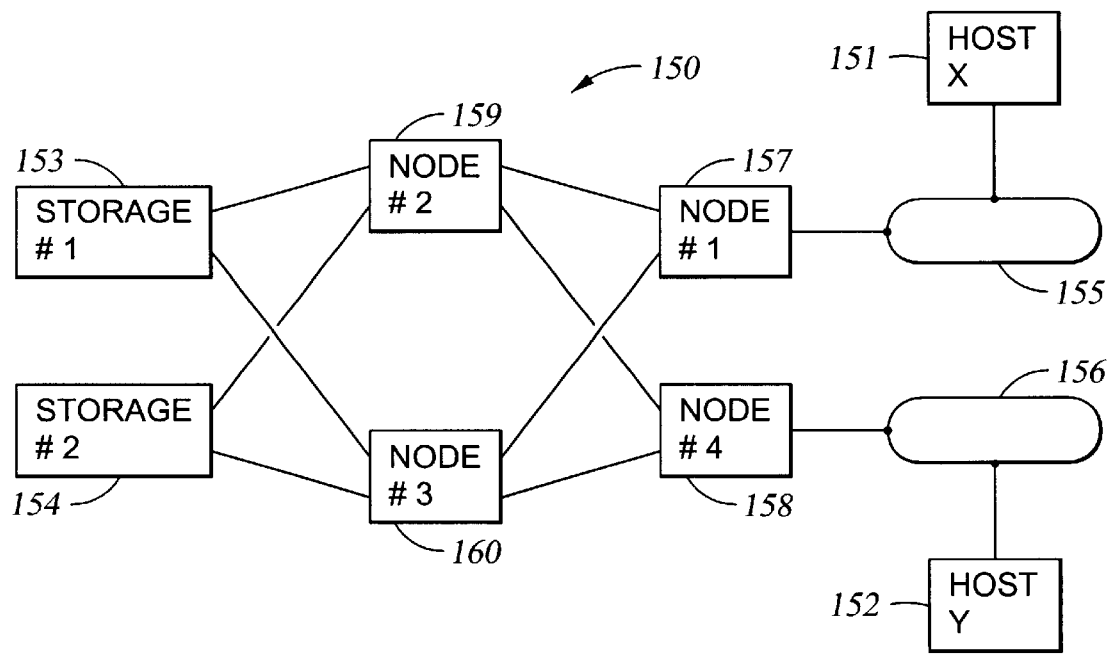
FIG. 11 is a table directory that could be used by the digital computer in FIG. 3 for determining the loading of each host on the storage subsystem and for determining the loading of the hosts on each storage port.
FIG. 12 is a schematic diagram of a data processing system having a plurality of intermediate nodes in a data network linking a plurality of hosts to a plurality of storage devices.

With reference to FIG. 12, for example, data network 150 links a number of hosts 151, 152 to a number of storage devices 153, 154. The data network includes a plurality of loops 155, 156, and intermediate nodes 157, 158, 159, 160. The possible paths for any host on loop 155 to the storage devices 153 and 154 could be listed as follows:

NODE1/NODE2/STORAGE1;

NODE1/NODE2/STORAGE1;

NODE1/NODE3/STORAGE2; and

NODE1/NODE3/STORAGE2.

However, when the host 151 named "HostX" asks the network directory services for the path names to storage devices in the network, it is told a respective subset of path names that it should use when accessing storage, such as:

NODE1/NODE2/STORAGE1; and

NODE1/NODE3/STORAGE2.

When a host accesses storage via the path NODE1/NODE2/STORAGE1, for example, the storage access request as transmitted by the host and received by the switch NODE1 includes a destination address of NODE1/NODE2/STORAGE1, so that the switch NODE1 directs the storage access request to the switch NODE2, and in a similar fashion, the switch NODE2 finds a destination address of NODE2/STORAGE1 in the storage access request and directs the storage access request to the storage port STORAGE1. In general, for each storage access request, the host instructs the switches to use a certain one of the paths in the respective subset of paths reported to it by the directory services, and the switches do the actual routing of the storage access request as instructed by the host.

Alternatively, the same information could be reported to each host as the host inquires about all nodes or ports that it or any node may directly access. For example, if HostX were to ask the directory services about the nodes or ports that it may directly access, it would be told that it may only directly access NODE1. Then HostX could inquire about the nodes or ports that it may access through NODE1, and the directory services would reply that it may access NODE2 and NODE3. Then HostX could inquire about the nodes or ports that it may access through NODE2, and the directory services would reply that it may access STORAGE1 through NODE2. Then HostX could inquire about the nodes or ports that it may access through NODE3, and the directory services would reply that it may access STORAGE 1 and STORAGE 2. In either case, the network directory services may present a different picture of the data network to each host that is on the same loop in the network. A host, for example, is only aware of the nodes on the paths that are reported to it. In general, a respective subset of the possible destination ports and possible paths can be reported to each host in a manner that is substantially compatible with conventional directory services and host network software appropriate for the network topology.

What is claimed is:

1. In a data processing system having a plurality of host processors and a data network linking the host processors to alternative shared resources for the communication of service requests from the host processors to the alternative shared resources, a method of controlling access of the host processors to the alternative shared resources, said method comprising:

a) storing in a directory a specification of a respective subset of the alternative shared resources which are accessible to each of the host processors, and operating a directory service for reporting network addresses of the alternative shared resources, the directory service accessing the directory in response to a request from each host processor for reporting to said each host processor a set of network addresses of the alternative shared resources for said each host processor, said set of network addresses of the alternative shared resources for said each host processor including only the network addresses of the alternative shared resources in the respective subset of the alternative shared resources which are accessible to said each host processor; and b) operating said each host processor including:

(i) said each host processor sending a request to the directory service for a report of network addresses of the alternative shared resources, and receiving from the directory service a report of the set of network addresses of the alternative shared resources for said each host processor; and then (ii) said each host processor commencing a sequence of data processing operations during which said each host processor transmits service requests to at least one network address in the set of network addresses of the alternative shared resources for said each host processor;

which includes estimating respective loadings that the host processors will have on the alternative shared resources, and selecting the respective subsets based on the estimates of the respective loadings in order to balance loadings of the host processors on the alternative shared resources, and which includes measuring loadings of the host processors on the alternative shared resources in order to estimate respective loadings that the host processors will have on the alternative shared resources;

wherein the loadings are measured by computing a modulus from a network address intercepted from the data network, and indexing a table with the modulus to locate an accumulator for accumulating an occurrence of the network address intercepted from the data network.

2. In a data processing system having a plurality of host processors and a data network including a switch linking the host processors to a plurality of ports of a storage subsystem for transmission of storage access requests from the host processors to the ports of the storage subsystem, a method of controlling access of the host processors to the ports of the storage subsystem, said method comprising:

a) storing in a directory a specification of a respective subset of the ports of the storage subsystem which are accessible to each of the host processors, and operating a directory service for accessing the directory and for reporting to each host processor the respective subset of the ports of the storage subsystem which are accessible to said each host processor; and b) operating said each host processor including:

(i) said each host processor sending a request to the directory service for a report of the respective subset of ports of the storage subsystem which are accessible to said each host processor; and receiving from the directory service a report of the subset of the ports of the storage subsystem which are accessible to said each host processor; and then (ii) said each host processor commencing a sequence of data processing operations during which said each host processor transmits storage access requests to at least one port included in the respective subset of ports of the storage subsystem which are accessible to said each host processor.

3. The method as claimed in claim 2, wherein the directory service is a name server for providing information about ports linked to the switch for transmission and reception of data routed through the switch, and the directory service reports to said each host processor a respective network address for each port included in the respective subset of ports of the storage subsystem which are accessible to said each host processor.

4. The method as claimed in claim 3, which includes estimating respective loadings that the host processors will have on the ports of the storage subsystem, and selecting the respective subsets based on the estimates of the respective loadings in order to balance loadings of the host processors on the ports of the storage subsystem.

5. The method as claimed in claim 4, which includes measuring loadings of the host processors on the ports of the storage subsystem in order to estimate respective loadings that the host processors will have on the ports of the storage subsystem.

6. The method as claimed in claim 5, wherein the loadings are measured by computing a modulus from a network address intercepted from the data network, and indexing a table with the modulus to locate an accumulator for accumulating an occurrence of the network address intercepted from the data network.

7. The method as claimed in claim 4, wherein the respective subsets are further selected based on respective priorities assigned to the host processors by including different numbers of the ports of the storage subsystem in the respective subsets.

8. The method as claimed in claim 2, wherein said each host processor sends the request to the directory service after said each host processor logs into the data network and is assigned a network address.

9. The method as claimed in claim 2, wherein the respective subset of ports of the storage subsystem which are accessible to at least one of the host processors includes a plurality of ports of the storage subsystem, and said at least one of the host processors sends storage access requests in round-robin fashion to the plurality of ports in the respective subset of ports of the storage subsystem which are accessible to said at least one of the host processors.

10. The method as claimed in claim 2, wherein the data processing system includes a directory service for reporting network addresses of all of the storage subsystem ports, and the method further includes incorporating into the data network a substitute directory service to which said each host processor sends the request for a report of ports of the storage subsystem that said each host processor should access.

11. The method as claimed in claim 10, wherein the data processing system further includes at least one host processor that does not send any requests to the substitute directory service, and the method further includes said at least one host processor sending a request to the directory service for reporting all of the ports of the storage subsystem, and in response said at least one processor obtaining a report of all of the ports of the storage subsystem, and thereafter said at least one host processor sending storage access requests to ports of the storage subsystem.

12. The method as claimed in claim 2, wherein at least some of the host processors have more than one possible path through the network to at least some of the ports of the storage subsystem, and the method further includes the directory service reporting to each of said at least some of the host processors a respective subset of the possible paths through the network to said at least some of the ports of the storage subsystem.

13. A digital computer programmed to provide a directory service in a data network, the digital computer being programmed with a configuration database of information about host processors in the network and shared resources in the network that are accessible to the host processors, the configuration database further including information specifying, for each host processor, a respective subset of the shared resources which are accessible to said each host processor, the digital computer being programmed to respond to a request from said each host processor for information about resources in the network by reporting to said each host processor information about the respective subset of the shared resources that are accessible to said each host processor, thereby selectively restricting access of the host processors to the shared resources;

wherein the digital computer is programmed to collect information about loading of the host processors upon the shared resources, and to adjust the respective subset of the shared resources which are accessible to said each host processor based upon the loading of the host processors upon the shared resources in order to balance loading of the host processors upon the shared resources.

14. The digital computer as claimed in claim 13, wherein the digital computer is programmed to collect information about loadings of the host processors upon the shared resources by computing a modulus from a network address intercepted from the data network, and indexing a table with the modulus to locate an accumulator for accumulating an occurrence of the network address intercepted from the data network.

15. A machine readable program storage device containing a program for programming a digital computer to provide a directory service in a data network, the directory service accessing a configuration database of information about host processors in the network and shared resources in the network and information specifying for each host processor a respective subset of the shared resources which are accessible to said each host processor, the directory service responding to a request from said each host processor for information about resources in the network by reporting to said each host processor information about the subset of the shared resources that are accessible to said each host processor, thereby selectively restricting access of the host processors to the shared resources;

wherein the computer program is executable by the digital computer for collecting information about loading of the host processors upon the shared resources, and adjusting the respective subset of the shared resources which are accessible to said each host processor based upon the loading of the host processors upon the shared resources in order to balance loading of the host processors upon the shared resources.

16. The machine readable program storage device as claimed in claim 15, wherein the computer program is executable by the digital computer for collecting information about loadings of the host processors upon the shared resources by computing a modulus from a network address intercepted from the data network, and indexing a table with the modulus to locate an accumulator for accumulating an occurrence of the network address intercepted from the data network.

17. A storage network comprising, in combination:
- a cached storage subsystem including a plurality of storage devices, a cache memory linked to the storage devices for filling the cache with data from the storage devices, and a plurality of port adapters providing storage ports for access to the cache memory; and
- a switch having a plurality of network ports and being linked to the storage ports for selectively routing data access requests from the network ports to the storage ports, the network ports being connectable for receiving the data access requests from a plurality of host processors;
- wherein the storage network includes a digital computer programmed with a configuration database of information about the host processors and the storage ports, the configuration database further including information specifying, for each host processor, a respective subset of the storage ports which are accessible to said each host processor, the digital computer being programmed to respond to a request from said each host processor for information about the storage ports by reporting to said each host processor information about the respective subset of the storage ports which are accessible to said each host processor, and thereby selectively restrict access of the host processors to the storage ports.

18. The storage network as claimed in claim 17, which further includes a network loop connected to each of the network ports for linking a respective group of the host computers to said each of the network ports for transmission of storage access requests from the host computers in the respective group to said each of the network ports.

19. The storage network as claimed in claim 17, wherein the digital computer is further programmed to assign temporary addresses to the storage ports and to the hosts linked to the network ports.

20. The storage network as claimed in claim 17, wherein the digital computer is programmed to respond to a network login request from said each host processor by returning a temporary address assigned to said each host processor.

21. The storage network as claimed in claim 17, wherein the digital computer is programmed to be a substitute for a network directory.

22. The storage network as claimed in claim 21, wherein the digital computer is programmed to access the network directory to obtain network addresses of the storage ports in the respective subset of storage ports that are accessible to said each host processor, and to forward the network addresses to said each host processor.

23. The storage network as claimed in claim 17, wherein the digital computer is a control computer of said switch.

24. The storage network as claimed in claim 17, wherein the digital computer is programmed to collect information about loading of the host processors upon the storage ports, and to adjust the respective subset of the storage ports which are accessible to said each host processor based upon the loading of the host processors upon the storage ports in order to balance loading of the host processors upon the storage ports.

25. The storage network as claimed in claim 24, wherein the digital computer is programmed to collect information about loadings of the host processors upon the storage ports by computing a modulus from a network address intercepted from a transmission between the host processors and the storage ports, and indexing a table with the modulus to locate an accumulator for accumulating an occurrence of the network address intercepted from the transmission between the host processors and the storage ports.

26. A digital computer programmed to provide a directory service in a data network, the digital computer being programmed with a configuration database of information about host processors in the network and shared resources in the network that are accessible to the host processors, the configuration database further including information specifying, for each host processor, a respective subset of the shared resources which are accessible to said each host processor, the digital computer being programmed to respond to a request from said each host processor for information about resources in the network by reporting to said each host processor information about the respective subset of the shared resources that are accessible to said each host processor, thereby selectively restricting access of the host processors to the shared resources;
- wherein the digital computer is programmed to be a substitute for a network directory; the digital computer is programmed to access the network directory to obtain network addresses of resources in the respective subset of resources that are accessible to said each host processor, and to forward the network addresses to said each host processor; and the digital computer is programmed to collect information about loading of the host processors upon the shared resources, and to adjust the respective subset of the shared resources which are accessible to said each host processor based upon the loading of the host processors upon the shared resources in order to balance loading of the host processors upon the shared resources.

27. The digital computer as claimed in claim 26, wherein the digital computer is programmed to collect information about loadings of the host processors upon the shared resources by computing a modulus from a network address intercepted from the data network, and indexing a table with the modulus to locate an accumulator for accumulating an occurrence of the network address intercepted from the data network.

28. A digital computer programmed to provide a directory service in a data network, the digital computer being programmed with a configuration database of information about host processors in the network and shared resources in the network that are accessible to the host processors, the configuration database further including information specifying, for each host processor, a respective subset of the shared resources which are accessible to said each host processor, the digital computer being programmed to respond to a request from said each host processor for information about resources in the network by reporting to said each host processor information about the respective subset of the shared resources that are accessible to said each host processor, thereby selectively restricting access of the host processors to the shared resources;
- wherein the digital computer is further programmed to assign temporary addresses to ports in the network; the digital computer is programmed to respond to a network login request from said each host processor by returning a temporary address assigned to said each host processor; the digital computer is a switch control computer of a switch for the network; and the digital computer is programmed to collect information about loading of the host processors upon the shared resources, and to adjust the respective subset of the shared resources which are accessible to said each host processor based upon the loading of the host processors upon the shared resources in order to balance loading of the host processors upon the shared resources.

29. The digital computer as claimed in claim 28, wherein the digital computer is programmed to collect information about loadings of the host processors upon the shared resources by computing a modulus from a network address intercepted from the data network, and indexing a table with the modulus to locate an accumulator for accumulating an occurrence of the network address intercepted from the data network.

30. In a data processing system having a plurality of host processors and a data network including a switch linking the host processors to a plurality of ports of a storage subsystem for transmission of storage access requests from the host processors to the ports of the storage subsystem, each of the ports being accessible to each of the host processors through the switch, a method of balancing loading of the host processors upon the ports of the storage subsystem, said method comprising:

a) storing in a directory lists of the ports of the storage subsystem, the lists of ports including a respective list of the ports of the storage subsystem which each of the host processor should access, and operating a directory service for accessing the directory and for reporting to said each host processor the respective ports of the storage subsystem which said each host processor should access; and b) operating said each host processor including:
   (i) said each host processor sending a request to the directory service for a report of the respective ports of the storage subsystem which said each host processor should access, and receiving from the directory service a report of the respective ports of the storage subsystem which said each host processor should access; and then
   (ii) said each host processor commencing a sequence of data processing operations during which said each host processor transmits storage access requests to at least one of the ports of the storage subsystem which said each host processor should access; wherein the method further includes monitoring loadings of the host processors upon the storage subsystem by obtaining for each of the host processors a respective count of frames of data transmitted between said each host processor and the ports of the storage subsystem, and adjusting the respective list of storage subsystem ports which said each host processor should access based on the respective count of frames of data transmitted between said each host processor and the ports of the storage subsystem.

31. The method as claimed in claim 30, which further includes monitoring the loading upon each of the storage subsystem ports by obtaining for each of the storage subsystem ports a respective count of frames of data transmitted between said each of the storage subsystem ports and the host processors, and responding to a log in of one of the host processors by including, in the respective list of storage subsystem ports that said one of the host processors should access, a number of the storage subsystem ports having the least respective counts of frames of data transmitted between said each of the storage subsystem ports and the host processors.

32. A storage system for providing data storage to a plurality of host processors, the storage system including a storage subsystem and a data network including a switch linking the host processors to a plurality of ports of a storage subsystem for transmission of storage access requests from the host processors to the ports of the storage subsystem, each of the ports being accessible to each of the host processors through the switch, the storage system further including a directory service accessible to the hosts for balancing loading of the host processors upon the ports of the storage subsystem, wherein the directory service contains lists of the ports of the storage subsystem, the lists of ports including a respective list of the ports of the storage subsystem which each of the host processor should access, the directory service being responsive to the host processors for reporting to said each host processor the respective ports of the storage subsystem which said each host processor should access, and the directory service being responsive to loadings of the host processors upon the storage subsystem by obtaining for each of the host processors a respective count of frames of data transmitted between said each host processor and the ports of the storage subsystem, and adjusting the respective list of storage subsystem ports which said each host processor should access based on the respective count of frames of data transmitted between said each host processor and the ports of the storage subsystem.

33. The storage system as claimed in claim 32, wherein the directory service is further programmed for monitoring the loading upon each of the storage subsystem ports by obtaining for each of the storage subsystem ports a respective count of frames of data transmitted between said each of the storage subsystem ports and the host processors, and responding to a log in of one of the host processors by including, in the respective list of storage subsystem ports that said one of the host processors should access, a number of the storage subsystem ports having the least respective counts of frames of data transmitted between said each of the storage subsystem ports and the host processors.

* * * * *